US011362994B2

(12) United States Patent
Strein et al.

(10) Patent No.: US 11,362,994 B2
(45) Date of Patent: *Jun. 14, 2022

(54) MEDIA FLOW TRANSPORT SECURITY MANAGEMENT

(71) Applicant: Disney Enterprises, Inc., Burbank, CA (US)

(72) Inventors: Michael J. Strein, Bohemia, NY (US); Douglas R. Mason, Larchmont, NY (US); Craig L. Beardsley, Chicago, IL (US); Benjamin H. Kepler, Palisades, NY (US)

(73) Assignee: Disney Enterprises, Inc., Burbank, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/869,236

(22) Filed: May 7, 2020

(65) Prior Publication Data
US 2020/0403972 A1 Dec. 24, 2020

Related U.S. Application Data

(60) Provisional application No. 62/864,279, filed on Jun. 20, 2019.

(51) Int. Cl.
*H04L 9/40* (2022.01)
*H04L 41/069* (2022.01)
(Continued)

(52) U.S. Cl.
CPC .......... *H04L 63/0236* (2013.01); *G06F 9/455* (2013.01); *G06F 9/45533* (2013.01);
(Continued)

(58) Field of Classification Search
CPC .... G06F 9/455; G06F 9/45533; G06F 9/5011; H04L 12/1868; H04L 12/1886;
(Continued)

(56) References Cited

U.S. PATENT DOCUMENTS 8,032,933 B2 * 10/2011 Turley ................ H04L 63/0263
726/11
8,601,144 B1 * 12/2013 Ryner ..................... G06F 21/45
709/228

(Continued)

*Primary Examiner* — Thomas J Dailey
(74) *Attorney, Agent, or Firm* — Farjami & Farjami LLP

(57) ABSTRACT

A media flow transport security manager of a hybrid cloud-based media production system having a network orchestrator and an extensible resource manager (ERM) includes a firewall communicatively coupled to a computing platform having a hardware processor and a memory storing a security software code. The hardware processor executes the security software code to communicate with the network orchestrator to identify multicast production media flow(s) for processing in a cloud-based virtual production environment, and to communicate with the ERM to obtain an identifier of each cloud-based resource used for processing cloud production media flow(s) corresponding to the identified multicast production media flow(s). The hardware processor also executes the security software code to receive an alert that the cloud production media flow(s) have been processed to generate corresponding post-production cloud media flow(s), and to route, using the obtained identifier of the cloud-based resource(s), the post-production cloud media flow(s) through the firewall.

20 Claims, 4 Drawing Sheets

(51) Int. Cl.

| | | |
|---|---|---|
| *H04L 12/18* | (2006.01) | |
| *G06F 9/455* | (2018.01) | |
| *H04L 65/611* | (2022.01) | |
| *H04L 65/60* | (2022.01) | |
| *H04L 65/65* | (2022.01) | |
| *G06F 9/50* | (2006.01) | |
| *H04L 47/70* | (2022.01) | |
| *H04L 67/10* | (2022.01) | |
| *H04L 43/04* | (2022.01) | |
| *H04L 43/062* | (2022.01) | |
| *H04L 65/1016* | (2022.01) | |
| *H04L 69/04* | (2022.01) | |
| *H04L 41/04* | (2022.01) | |
| *H04N 21/266* | (2011.01) | |
| *H04N 21/6408* | (2011.01) | |
| *H04L 67/1097* | (2022.01) | |
| *H04N 21/6405* | (2011.01) | |

(52) U.S. Cl.
CPC ........ *G06F 9/5011* (2013.01); *H04L 12/1868* (2013.01); *H04L 12/1886* (2013.01); *H04L 41/04* (2013.01); *H04L 41/069* (2013.01); *H04L 43/04* (2013.01); *H04L 43/062* (2013.01); *H04L 47/82* (2013.01); *H04L 65/1016* (2013.01); *H04L 65/4076* (2013.01); *H04L 65/60* (2013.01); *H04L 65/602* (2013.01); *H04L 65/607* (2013.01); *H04L 65/608* (2013.01); *H04L 67/10* (2013.01); *H04L 67/1097* (2013.01); *H04L 69/04* (2013.01); *H04N 21/26616* (2013.01); *H04N 21/6405* (2013.01); *H04N 21/6408* (2013.01); *H04L 63/0428* (2013.01)

(58) Field of Classification Search
CPC ....... H04L 41/04; H04L 41/069; H04L 43/04; H04L 43/062; H04L 47/82; H04L 63/0236; H04L 63/0428; H04L 65/1016; H04L 65/4076; H04L 65/60; H04L 65/602; H04L 65/607; H04L 65/608; H04L 67/10; H04L 67/1097; H04L 69/04; H04N 21/26616; H04N 21/6405; H04N 21/6408

See application file for complete search history.

(56) References Cited

U.S. PATENT DOCUMENTS

| | | | |
|---|---|---|---|
| 9,300,633 | B2 * | 3/2016 | Acharya ............. H04L 61/2575 |
| 9,380,030 | B2 * | 6/2016 | Ezell ..................... H04L 63/029 |
| 11,126,173 | B2 | 9/2021 | Celia et al. |
| 11,129,025 | B1 | 9/2021 | Yoskowitz et al. |
| 2008/0279219 | A1 | 11/2008 | Wu et al. |
| 2012/0030319 | A1 * | 2/2012 | Andries ............. H04L 41/5035 709/220 |
| 2016/0065623 | A1 * | 3/2016 | Whynot .................. H04L 67/02 709/227 |
| 2016/0381093 | A1 | 12/2016 | Diaz et al. |
| 2017/0331926 | A1 | 11/2017 | Raveh et al. |
| 2019/0043207 | A1 | 2/2019 | Carranza et al. |
| 2019/0141124 | A1 | 5/2019 | Zhang et al. |
| 2020/0107062 | A1 | 4/2020 | Pichaimurthy et al. |
| 2020/0145700 | A1 | 5/2020 | Meyer |
| 2020/0236083 | A1 | 7/2020 | Johns |
| 2020/0403972 | A1 | 12/2020 | Strein et al. |
| 2020/0404033 | A1 | 12/2020 | Strein et al. |
| 2020/0404034 | A1 | 12/2020 | Strein et al. |
| 2020/0404035 | A1 | 12/2020 | Strein et al. |
| 2021/0250103 | A1 | 8/2021 | Rippon |

* cited by examiner

MEDIA FLOW TRANSPORT SECURITY MANAGEMENT

RELATED APPLICATION(S)

The present application claims the benefit of and priority to Provisional Patent Application Ser. No. 62/864,279, filed Jun. 20, 2019, and titled "Cloud-Extensible Media Production," which is hereby incorporated fully by reference into the present application.

The present application is related to U.S. patent application Ser. No. 16/869,137, filed concurrently with the present application, and titled "Hybrid Cloud-Based Media Production", now U.S. Pat. No. 11,228,564; U.S. patent application Ser. No. 16/869,203, filed concurrently with the present application, and titled "Extensible Resource Management for Hybrid Cloud-Based Media Production", now U.S. Pat. No. 11,212,258; and U.S. patent application Ser. No. 16/800,853, filed on Feb. 25, 2020, and titled "Software Defined Network Orchestration to Manage Media Flows for Broadcast with Public Cloud Networks," now U.S. Patent Publication No. 2020/0404033, which are hereby incorporated fully by reference into the present application.

BACKGROUND

Security in media networks has traditionally been managed using so called "air gaps," in which the media networks are prevented from having external connectivity. As it has become increasingly important for media network nodes to connect to resources outside of a local environment, such as to a post-production facility or an Internet connected feed for example, security has typically been provided through the manual management of destination Internet Protocol (IP) addresses, the manual opening of switch ports, and the manual configuration of firewalls. However, as media production migrates from traditional on-premises production facilities to cloud-based production resources requiring the transport of media flows into and out of a public cloud, there is a need in the art for a nimble security solution capable of ensuring media flow integrity in a dynamic network environment.

SUMMARY

There are provided systems and methods for providing media flow transport security management, substantially as shown in and/or described in connection with at least one of the figures, and as set forth more completely in the claims.

DETAILED DESCRIPTION

Figure 1:
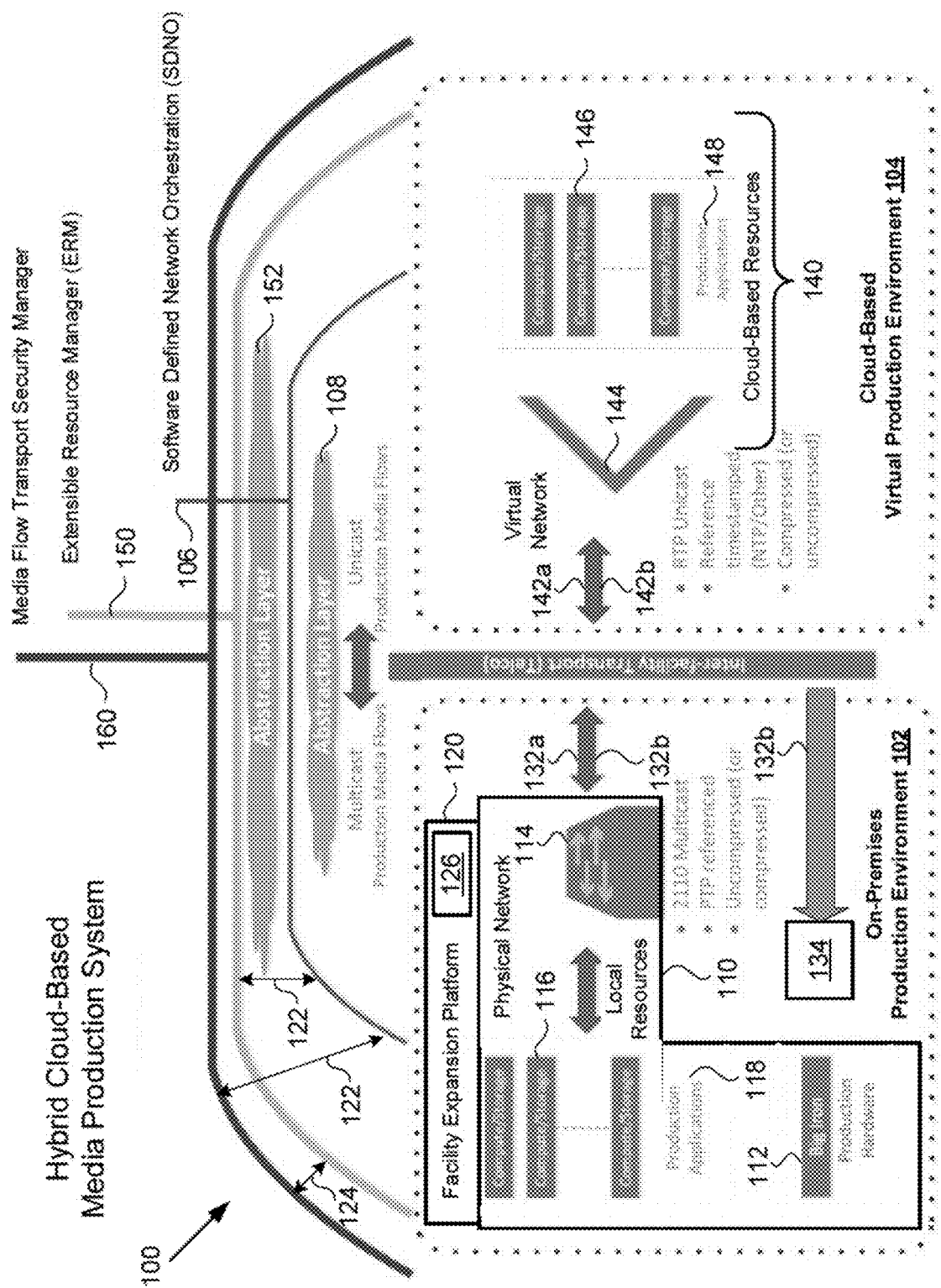
FIG. 1 shows a diagram of an exemplary hybrid cloud-based media production system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application describes a media flow transport security manager for a hybrid cloud-based media production system, which addresses and overcomes the drawbacks and deficiencies in the conventional art. In one implementation, the media flow transport security manager disclosed by the present application is configured to ensure the integrity of media flows passing to and from cloud-based resources of a hybrid local/cloud-based production system. The comprehensive control over management of the production media flows for such a system, commonly known as Software Defined Network Orchestration (hereinafter "SDNO") is performed by a network orchestrator of the system (hereinafter "SDNO"), supported by an extensible resource manager (ERM). The SDNO and ERM are configured to extend seamlessly between the local and cloud-based "virtual" production environments to enable a highly scalable and dynamic media-over-IP production solution.

It is noted, that as used in the present application, the expression "hybrid cloud-based media production" may refer to brick-and-mortar production facilities that are extensible into the cloud so as to include cloud-based virtual production resources, as well as to production systems relying entirely or substantially on virtual media processing resources. Consequently, the expressions "hybrid cloud-based media production" and "cloud-extensible media production" may be used interchangeably in the present disclosure. It is further noted that the hybrid cloud-based media production solution disclosed in the present application is cloud agnostic, i.e., not specifically designed for implementation in a particular type of cloud environment. Consequently, the cloud virtual production environment into which the present solution expands may include multiple distinct cloud environments, and thus may be a multi-cloud virtual production environment.

It is also noted that, in some implementations, the present media flow transport security manager may be implemented as a substantially automated security solution. As used in the present application, the terms "automation," "automated", and "automating" refer to media flow transport security managers and their processes that do not require the participation of a human user, such as a human security administrator. Although, in some implementations, a human security administrator may review, or even intervene, in the actions determined by the automated media flow transport security managers and according to the automated methods described herein, that human involvement is optional. Thus, in some implementations, the methods described in the present application may be performed under the control of hardware processing components of the disclosed media flow transport security managers.

FIG. 1 shows exemplary hybrid cloud-based media production system 100, according to one implementation. As shown in FIG. 1, hybrid cloud-based media production system 100 includes on-premises production environment 102 interactively linked with cloud-based virtual production environment 104. As shown in FIG. 1, on-premises production environment 102 includes local resources 110 generating multicast production media flows 132a and communicatively coupled to facility expansion platform 120. Local resources 110 include "big iron" production hardware 112, local physical production network 114, local computing and data storage resources 116, and local production applications 118. In addition, FIG. 1 shows SDNO 106, ERM 150, and media flow transport security manager 160, as well as graphical user interface (GUI) 126 of facility expansion platform 120 providing a production monitoring and/or control dashboard for an optional user of hybrid cloud-based media production system 100. Also shown in FIG. 1 are abstraction layer 108 associated with SDNO 106, abstraction layer 152 associated with ERM 150, communication links 122 between SDNO 106 and ERM 150 and between SDNO 106 and media flow transport security manager 160, which may be provided by an application programming interface (API) (hereinafter "SDNO API 122"), as well as communication link 124 between ERM 150 and media flow transport security manager 160, which may also be provided by an API (hereinafter "ERM API 124").

With respect to abstraction layer 104 associated with SDNO 106, and abstraction layer 152 associated with ERM 150, it is noted that an abstraction layer is a series of software services (often called microservices) providing and accomplishing specific functions, as known in the art. Abstraction layer 104 supports both "east/west" lateral communications between other software services and "north/south" vertical communications between the layers that call these services for SDNO 106, while abstraction layer 152 provides analogous communications support for ERM 150.

Cloud-based virtual production environment 104 includes cloud-based resources 140 configured to receive and process cloud production media flows 142a corresponding to multicast production media flows 132a, thereby generating post-production cloud media flows 142b. As shown in FIG. 1, cloud-based resources 140 include cloud bandwidth 144, cloud-based computing and data storage resources 146, and cloud-based production applications 148. Also shown in FIG. 1 is physical, i.e., not cloud-based or virtual, post-production facility 134 receiving post-production multicast media flows 132b corresponding to post-production cloud media flows 142b.

It is noted that physical post-production facility 134 may be another production facility similar to on-premises production environment 102, or may be a media distribution hub, such as a regional affiliate or other affiliated media distributor. It is further noted that post-production multicast media flows 132b correspond to post-production cloud media flows 142b after post-production cloud media flows 142b are converted from a cloud permissible media flow type, such as unicast, to multicast. It is further noted that cloud production media flows 142a are processed to generate post-production cloud media flows 142b using cloud-based virtual production environment 104.

It is also noted that "multicast" is a term used to describe communication in which a piece of information is sent from one or more points to a set of other points. In this case there may be one or more senders, and the information is distributed to a group of receivers. One example of an application which may use multicast is a video server sending out networked television (TV) channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. IP multicast provides dynamic many-to-many connectivity between a set of senders (at least 1) and a group of receivers.

The format of an IP multicast packet is identical to that of unicast packets and is distinguished by the use of a special class of destination address (i.e., class D IPv4 address), which denotes a specific multicast group. Since Transmission Control Protocol (TCP) supports only the unicast mode, multicast applications must typically use the User Datagram Protocol (UDP) transport protocol. Unlike broadcast transmission, which is used on some local area networks (LANs), multicast clients receive a stream of packets only if they have previously elected to do so, for example by joining the specific multicast group address. Membership of a group may be dynamic and may be controlled by the receivers, which are informed by the local client applications. The routers in a multicast network learn which sub-networks have active clients for each multicast group and attempt to minimize the transmission of packets across parts of the network for which there are no active clients. The multicast mode is useful if a group of clients require a common set of data at the same time, or when the clients are able to receive and store common data until needed. Where there is a common need for the same data required by a group of clients, multicast transmission may provide significant bandwidth savings, for example, up to 1/N of the bandwidth compared to N separate unicast clients.

It is noted that in cloud-based computing environments, whether they are public or private, multicast flow management has typically been impermissible due in part to the unpredictable demands that multicast signals can place on cloud bandwidth. However, it is contemplated that cloud-based virtual production environment 104 may evolve to accommodate multicast flow management. Consequently, in some implementations cloud production media flows 142a and post-production cloud media flows 142b may be multicast media flows. Nevertheless, most present use cases require conversion of multicast production media flows 132a into unicast production media flows prior to processing in cloud-based virtual production environment 104. Thus, in some implementations, cloud production media flows 142a may be unicast production media flows 142a, and post-production cloud media flows 142b may be post-production unicast media flows 142b.

In contrast to multicast, "unicast" is a term used to describe communication in which a piece of information is sent from one point to another point. In this case there is just one sender and one receiver. Unicast transmission, in which a packet is sent from a single source to a specified destination, is a predominant form of transmission on LANs and within the Internet. All LANs, such as Ethernet, for example, as well as IP networks, support the unicast transfer mode. Examples of the standard unicast applications supported by LANs and IP networks include Hypertext Transfer Protocol (HTTP). Simple Mail Transfer Protocol (SMTP), File Transfer Protocol (FTP), and Telnet, each of which employs TCP.

Hybrid cloud-based media production system 100 provides an exemplary framework by which on-premises production environment 102 can scale larger by expanding into cloud-based virtual production environment 104. That expansion may include the following:

1) Media-over-IP multicast production media flows 132a are converted to unicast or other cloud permissible production media flows 142a as they move into cloud-based virtual production environment 104.

2) SDNO 106 extends into cloud-based virtual production environment 104 from on-premises production environment 102 to manage cloud production media flows 142a in cloud-based virtual production environment 104, creating a virtual network managing the bandwidth and allocation of cloud production media flows 142a, as well as the announce and discovery of cloud-based resources 140. In other words, SDNO 106 enables cloud-based resources 140 for required production processes and manages the connections. In one implementation, this would be accomplished by the cloud providers supplying standard APIs to cloud-based resources 140.

3) ERM 150 communicates with SDNO 106, and coordinates and books cloud-based resources 140 required by the media workflows, spinning up computing and storage processes as needed, and loading the required applications. ERM 150 can additionally manage the licenses for the applications, should additional applications be required. ERM management of cloud-based resources 140 and licensing may be API-based such that ERM 150 can present media based dashboard to a user via GUI 126 of hybrid cloud-based media production system 100, while allocating the appropriate resources from the cloud provider.

4) Conversion of one or more multicast production media flows 132a into one or more cloud production media flows 142a is typically performed before delivery of one or more cloud production media flows 142a into cloud bandwidth 144 of cloud-based virtual production environment 104. Media flow transport security manager 160 communicates with SDNO 106 and ERM 150 to dynamically control a firewall (firewall not shown in FIG. 1) to route one or more cloud production media flows 142a from on-premises production environment 102 to cloud-based virtual production environment 104 and/or to route post-production cloud media flows 142b from cloud-based virtual production environment 104 to on-premises production environment 102. Media flow transport security manager 160 is configured to ensure the integrity of cloud production media flows 142a and post-production cloud media flows 142b, while concurrently minimizing transport latency due to packet inspection.

Figure 2:
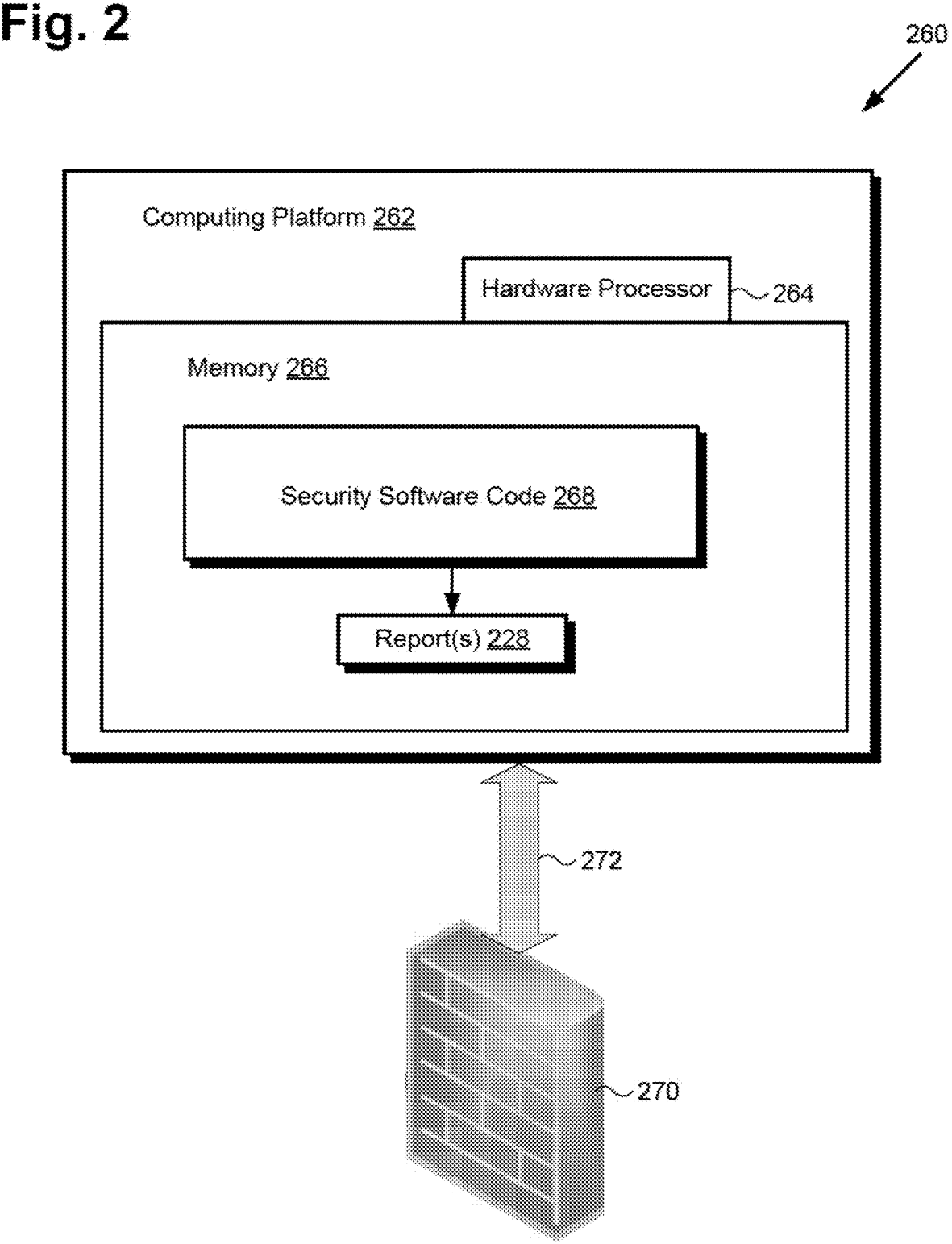
FIG. 2 shows a diagram of an exemplary media flow transport security manager suitable for use as part of the system of FIG. 1, according to one implementation.

FIG. 2 shows a diagram of exemplary media flow transport security manager 260, according to one implementation. As shown in FIG. 2, media flow transport security manager 260 includes firewall 270 and computing platform 262 communicatively coupled to firewall 270 by communication link 272, which may be provided by an AP (hereinafter "security manager API 272"). As further shown in FIG. 2, computing platform 262 of media flow transport security manager 260 includes hardware processor 264 and memory 266 implemented as a non-transitory storage device. According to the present exemplary implementation, memory 266 stores security software code 268, and may store one or more reports 228 (hereinafter "report(s) 228") generated by security software code 268.

Media flow transport security manager 260 corresponds in general to media flow transport security manager 160, in FIG. 1. As a result, media flow transport security manager 160 may share any of the characteristics attributed to media flow transport security manager 260 by the present disclosure, and vice versa. Thus, although not shown in FIG. 1, media flow transport security manager 160 may include computing platform 262 and firewall 270 communicatively coupled by security manager API 272. Moreover, like media flow transport security manager 160, media flow transport security manager 260 may be communicatively coupled to SDNO 106 by SDNO API 122, and may be communicatively coupled to ERM 150 by ERM API 124.

Media flow transport security manager 160/260 may use firewall 270 to restrict transport of media flows into and out of cloud-based virtual production environment 104. For example, firewall 270 may be configured to whitelist known authorized or authenticated IP addresses and to blacklist known unauthorized or unauthenticated or suspect IP addresses, to open allowed ports for the transit of media flows, and to implement other appropriate security functionality, as known in the art. Media flow transport security manager 160/260 may be configured to manage a database of whitelisted and blacklisted IP addresses, as well as their accessed ports, and may also manage security certificates, such as Secure Sockets Layer (SSL) certificates, for example.

It is noted that, although the present application refers to security software code 268 as being stored in memory 266 for conceptual clarity, more generally, memory 266 may be any computer-readable non-transitory storage medium. The expression "computer-readable non-transitory storage medium," as used in the present application, refers to any medium, excluding a carrier wave or other transitory signal that provides instructions to hardware processor 264 of media flow transport security manager 160/260. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 2 depicts security software code 268 as being stored as single software module in memory 266, that representation is also provided merely as an aid to conceptual clarity. More generally, media flow transport security manager 160/260 may include one or more computing platforms, such as computer servers or computer work stations for example, which may be co-located, or may form an interactively linked but distributed network.

As a result, hardware processor 264 and memory 266 may correspond to distributed processor and memory resources. Thus, it is to be understood that security software code 268 may be stored and/or executed using the distributed memory and/or processor resources of media flow transport security manager 160/260. Media flow transport security manager 160/260 may correspond to one or more web servers, accessible over a packet-switched network such as the Internet, for example. Alternatively, media flow transport security manager 160/260 may correspond to one or more computer servers supporting a wide area network (WAN), a LAN, or included in another type of limited distribution or private network.

A user of hybrid cloud-based media production system 100 may utilize GUI 126 to review the security and security history of hybrid cloud-based media production system 100 as described in report(s) 228 generated by security software code 268 of media flow transport security manager 160/260, when executed by hardware processor 264. Report(s) 228 may include security logs, and/or performance metrics, and/or security alerts. For example, in some implementations report(s) generated by security software code 268 may describe packet inspections performed during transport of post-production cloud media flows 142b through firewall 272. It is noted that, in various implementations, report(s)

228 generated using security software code 268 may be stored in memory 266 and/or may be copied to non-volatile storage. Alternatively, or in addition, and as noted above, in some implementations those reports may be displayed to a user of hybrid cloud-based media production system 100 via GUI 126.

In public cloud environments, the cloud host provider may work with SDNO 106, and ERM 150 to present to an on-premises production environment 102 based system user a hybrid but apparently seamless production environment secured by media flow transport security manager 160/260. Standards and specifications such as Networked Media Open Specifications (NMOS) that define the methods for discovery, bandwidth reservation, and the like can be used to establish the framework to create this hybrid architecture, and enable ERM 150 and SDNO 106 to establish the features required for a dynamic environment. As a result, SDNO 106 and ERM 150 would present to the user a seamless environment in which lit is impossible, or nearly so, to distinguish where on-premises production environment 102 ends and cloud-based virtual production environment 104 begins, while media flow transport security manager 160/260 ensures the integrity of media flows being transported between the on-premises production environment 102 and the cloud-based virtual production environment 104.

Figure 3:
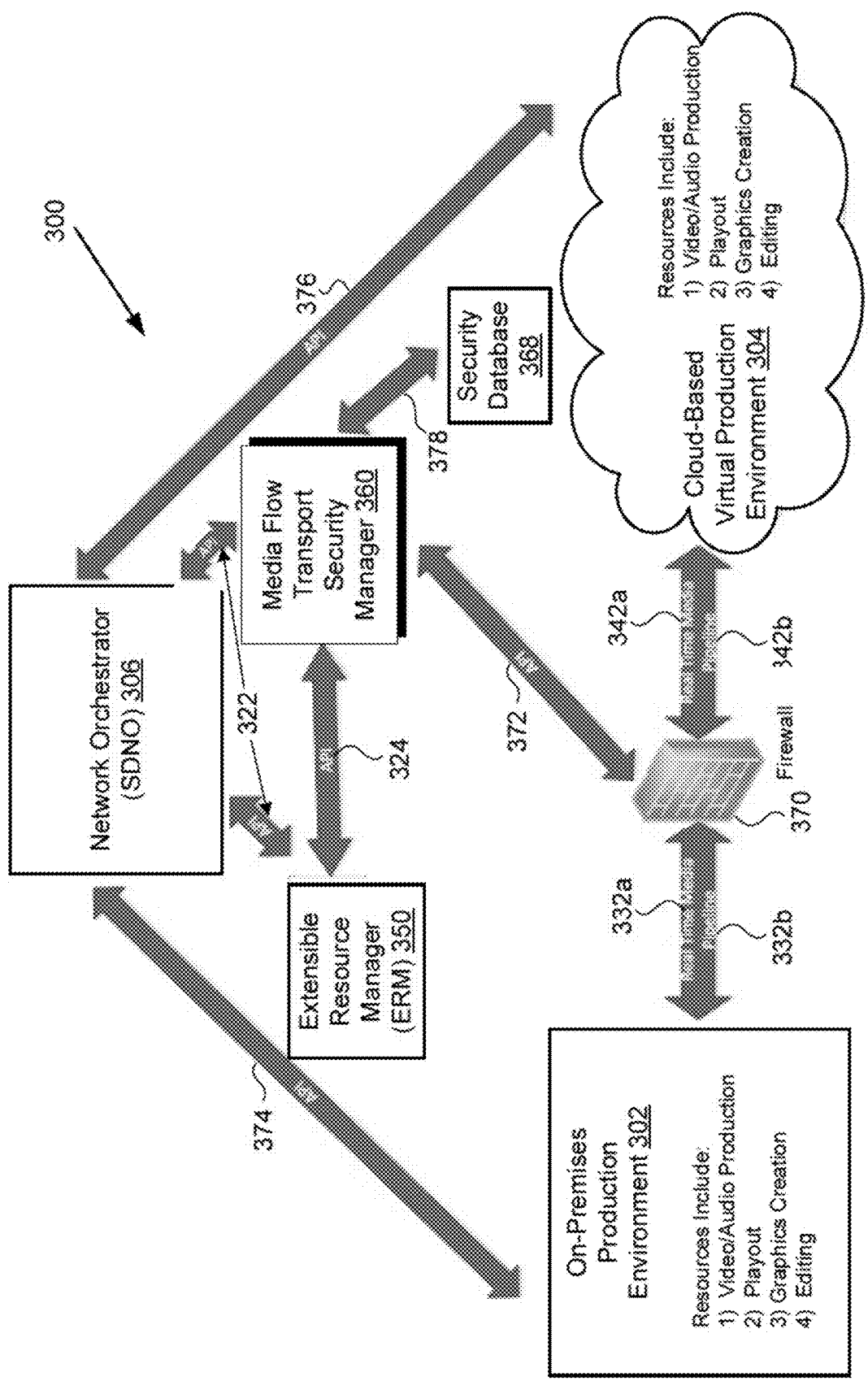
FIG. 3 shows a diagram of an exemplary interaction environment for the media flow transport security manager of FIG. 2, according to one implementation.

FIG. 3 shows a diagram of exemplary interaction environment 300 for media flow transport security manager 360 during a hybrid cloud-based media production process, according to one implementation. As shown in FIG. 3, in addition to media flow transport security manager 360 including firewall 370 and security manager API 372, interaction environment 300 includes on-premises production environment 302, cloud-based virtual production environment 304, network orchestrator or SDNO 306, ERM 350, and security database 368. In addition, FIG. 3 shows SDNO API 322, ERM API 324, on-premises production API 374, cloud API 376, and local network communication link 378 supporting communications between media flow transport security manager 360 and security database 368.

Also shown in FIG. 3 are multicast production media flows 332a, cloud production media flows 342a, which may be unicast production media flows corresponding to multicast production media flows 332a, for example, post-production cloud media flows 342b resulting from processing of cloud production media flows 342a in cloud-based virtual production environment 304, and post-production multicast media flows 332b corresponding to post-production cloud media flows 342b. It is noted that in use cases in which multicast media flows are permissible in cloud-based virtual environment 304, the correspondence between cloud production media flows 342a and multicast production media flows 332a, as well as the correspondence between post-production multicast media flows 332b and post-production cloud media flows 342b may be one-to-one. However, in use cases in which multicast media flows are impermissible in cloud-based virtual environment 304, the correspondence between cloud production media flows 342a and multicast production media flows 332a may be many-to-one, while the correspondence between post-production multicast media flows 332b and post-production cloud media flows 342b may be one-to-many.

Media flow transport security manager 360 corresponds in general to media flow transport security manager 160/260 in FIGS. 1 and 2. Consequently, media flow transport security manager 360 may share any of the characteristics attributed to media flow transport security manager 160/260 by the present disclosure, and vice versa. In addition, firewall 370 and security manager API 372 correspond respectively in general to firewall 270 and security manager API 272, in FIG. 2.

On-premises production environment 302, cloud-based virtual production environment 304, network orchestrator or SDNO 306, and ERM 350 correspond respectively in general to on-premises production environment 102, cloud-based virtual production environment 104, SDNO 106, and ERM 150 in FIG. 1. As a result, on-premises production environment 302, cloud-based virtual production environment 304, network orchestrator or SDNO 306, and ERM 350 may share any of the characteristics attributed to respective on-premises production environment 102, cloud-based virtual production environment 104, SDNO 106, and ERM 150 by the present disclosure, and vice versa.

SDNO API 322 and ERM API 324 correspond respectively in general to SDNO API 122 and ERM API 124, in FIG. 1, and those corresponding features may share any of the characteristics attributed to either corresponding feature by the present disclosure. Moreover, multicast production media flows 332a, cloud production media flows 342a, post-production cloud media flows 342b, and post-production multicast media flows 332b correspond respectively in general to multicast production media flows 132a, cloud production media flows 142a, post-production cloud media flows 142b, and post-production multicast media flows 132b. Thus, multicast production media flows 332a, cloud production media flows 342a, post-production cloud media flows 342b, and post-production multicast media flows 332b may share any of the characteristics attributed to respective multicast production media flows 132a, cloud production media flows 142a, post-production cloud media flows 142b, and post-production multicast media flows 132b by the present disclosure, and vice versa. That is to say, in some implementations, cloud production media flows 342a may be unicast production media flows 342a, and post-production cloud media flows 342b may be post-production unicast media flows 342b.

Figure 4:
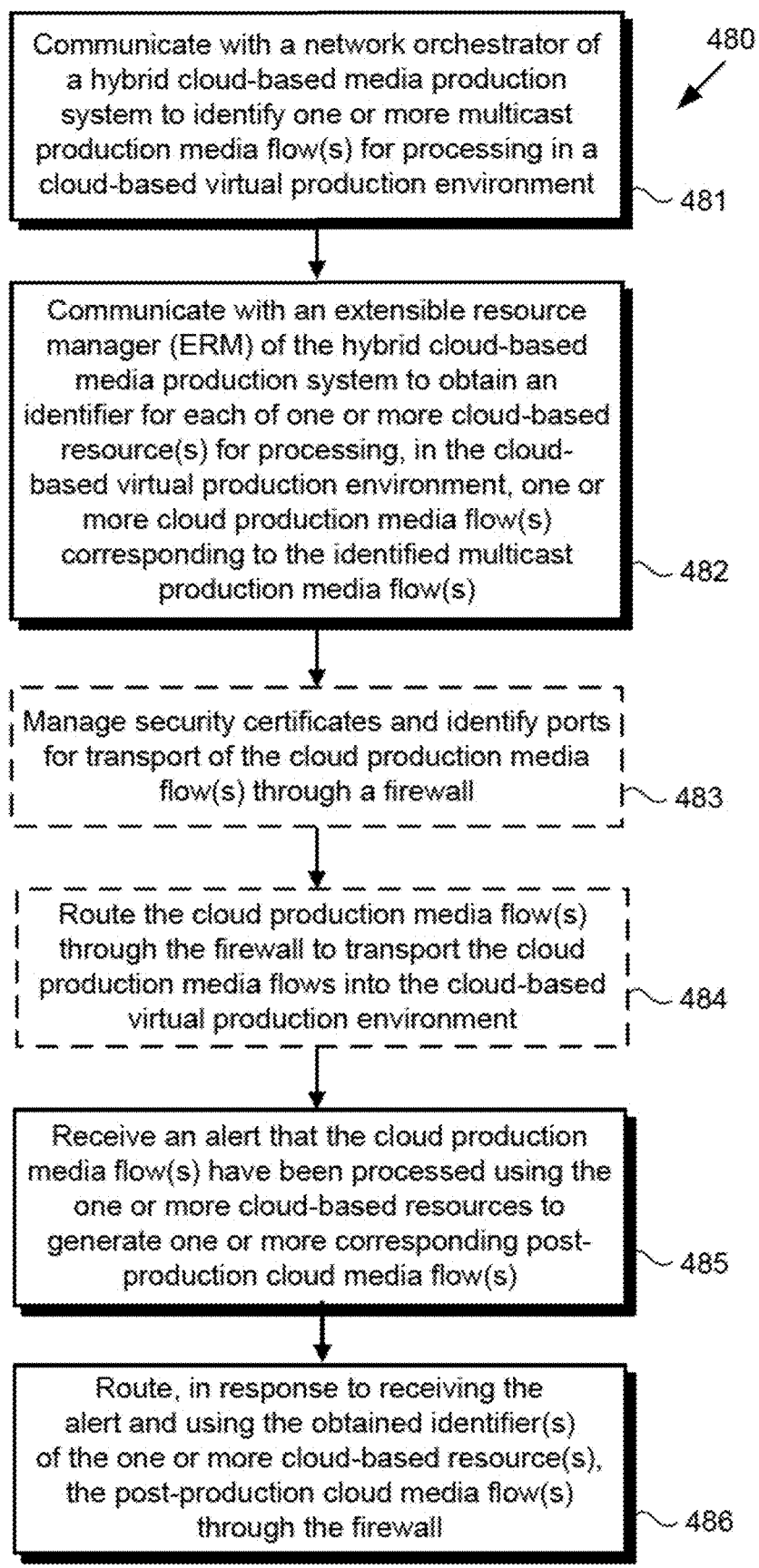
FIG. 4 shows a flowchart presenting an exemplary method for use by a media flow transport security manager, according to one implementation.

The functionality of media flow transport security manager 160/260/360 will be further described by reference to FIG. 4 in combination with FIGS. 1, 2, and 3. FIG. 4 shows flowchart 480 presenting an exemplary method for use by media flow transport security manager 160/260/360. With respect to the method outlined in FIG. 4, it is noted that certain details and features have been left out of flowchart 480 in order not to obscure the discussion of the inventive features in the present application.

Referring to FIGS. 1, 3, and 4 in combination, flowchart 480 begins with communicating with SDNO 106/306 to identify one or more multicast production media flows 132a/332a for processing in cloud-based virtual production environment 104/304 (action 481). Multicast production media flows 132a/332a may include streaming audio content, streaming video content, streaming audio-video content, graphics, or one or more media files, to name a few examples. Where multicast production media flows 132a/332a include video, they may take the form of camera feeds or remote feeds, for example.

The cloud-based processing of multicast production media flows 132a/332a may be triggered by workflow requirements, such as turnaround time or scheduling, by resource constraints imposed by local resources 110, or may be scheduled to occur at predetermined intervals (e.g., daily, weekly, monthly, etc.), for example. Referring to FIG. 2, with continued reference to FIGS. 1, 3, and 4, action 481 may be performed by security software code 268, executed by hardware processor 264 of media flow transport security manager 160/260/360, and using SDNO AP 122/322.

Flowchart 480 continues with communicating with ERM 150/350 to obtain an identifier of each of cloud-based resources 140 used for processing, in cloud-based virtual production environment 104/304, one or more cloud production media flows 142a/342a corresponding to the multicast production media flows 132a/332a identified in action 481 (action 482). ERM 150/350 is responsible for provisioning cloud-based virtual production environment 104/304 with the one or more cloud-based resources 140 identified by ERM 150/350 as being needed for processing one or more cloud production media flows 142a/342a in cloud-based virtual production environment 104/304. Provisioning of cloud-based virtual production environment 104/304 with cloud-based resources 140 may include one or more of reserving cloud bandwidth 144, ordering cloud-based computing and data storage resources 146, and ordering cloud-based production applications 148, for example.

The identifier obtained in action 482 for each cloud-based resource 140 used to process one or more cloud production media flows 142a/342a in cloud-based virtual production environment 104/304 may be its IP address, for example, which is typically established during the provisioning performed by ERM 150/350. Action 482 may be performed by security software code 268, executed by hardware processor 264 of media flow transport security manager 160/260/360, and using ERM API 374.

As noted above, conversion of one or more multicast production media flows 132a/332a into one or more cloud production media flows 142a/342a is typically performed before delivery of one or more cloud production media flows 142a/342a into cloud bandwidth 144 of cloud-based virtual production environment 104/304. Conversion of one or more multicast production media flows 132a/332a into one or more cloud production media flows 142a/342a may include aliasing, performing Network Address Translation (NATing), or some other form of IP address translation to convert one or more multicast production media flows 132a/332a into unicast production media flows, or into any other IP transmission format permissible in cloud-based virtual production environment 104/304. In some implementations, that conversion may be performed by hybrid cloud-based media production system 100. In those implementations, the method outlined in flowchart 480 may optionally continue with managing security certificates and identifying ports for transport of one or more cloud production media flows 142a/342a through firewall 270/370 into cloud-based virtual production environment 104/304 (action 483).

As noted above, media flow transport security manager 160/260/360 may use firewall 270/370 to enable transport of cloud production media flows 142a/342a into cloud-based virtual production environment 104/304. Media flow transport security manager 160/260/360 manages the database of whitelisted and blacklisted IP addresses, as well as their accessed ports, and also manages security certificates, such as SSL certificates, for transport of cloud production media flows 142a/342a into cloud-based virtual production environment 104/304. Optional action 483 may be performed by security software code 268, executed by hardware processor 264 of media flow transport security manager 160/260/360.

In some implementations, the method outlined by flowchart 480 may further continue with the optional action of routing one or more cloud production media flows 132a/142a through firewall 270/370 to transport one or more cloud production media flows 142a/342a into cloud-based virtual production environment 104/304 (action 484). However, in other implementations, conversion of one or more multicast production media flow(s) 132a/332a into one or more cloud production media flows 142a/342a may be performed by a host provider supplying cloud-based resources 140, or by an independent third-party provider of multicast to cloud conversion services. Optional action 484 may be performed by security software code 268, executed by hardware processor 264 of media flow transport security manager 160/260/360, and using firewall 270/370 and security manager API 272/372.

It is noted that due to actions 483 and 484 being optional, in some implementations, the method outlined by flowchart 480 may proceed directly from action 482 to action 485 described below. Alternatively, that method may include action 483 but then proceed directly to action 485. As yet another alternative, the method outlined by flowchart 480 may proceed from action 482 to action 483 and then omit action 484 to proceed directly to action 485. It is further noted that in some implementations in which actions 483 and 484 are performed, those actions may be performed substantially in parallel, i.e., substantially concurrently.

Flowchart 480 continues with receiving an alert that one or more cloud production media flows 142a/342a have been processed using the one or more cloud-based resources 140 to generate corresponding one or more post-production cloud media flows 142b/342b (action 485). As noted above, SDNO 106/306 controls the processing of one or more cloud production media flows 142a/342a in cloud-based virtual production environment 104/304. In its support role, and in addition to provisioning cloud-based virtual production environment 104/304 with cloud-based resources 140 for processing one or more cloud production media flows 142a/342a, ERM 150/350 is responsible for relinquishing those resources and deactivating cloud-based virtual production environment 104/304 after processing of one or more cloud production media flows 142a/342a to generate corresponding one or more post-production cloud media flows 142b/342b has been completed.

Thus, in various implementations, the alert received in action 485 may be received from either or both of SDNO 106/306 and/or ERM 150/350. That is to say, media flow transport security manager 160/260/360 may receive the alert from SDNO 106/306, or may receive the alert from ERM 150/350, or may receive one alert from SDNO 106/306 and another alert from ERM 150/350. Action 485 may be performed by security software code 268, executed by hardware processor 264 of media flow transport security manager 160/260/360. In some implementations, the alert or alerts received in action 485 may be displayed on GUI 126 of facility expansion platform 120. In addition, or alternatively, the alert or alerts received in action 485 may be included in report(s) 228 generated by security software code 268

Flowchart 480 continues with muting, in response to receiving the alert, and using the identifier of each of cloud-based resource(s) 140 obtained in action 482, one or more post-production cloud media flows 142b/342b through firewall 270/370 (action 486). Security software code 268, when executed by hardware processor 264, is configured to dynamically control firewall 270/370 via security manager API 272/372 to insure the integrity of media flows being transported into and out of cloud-based virtual production environment 104/304. In some implementations, the routing performed in action 486 transports one or more post-production cloud media flows 142b/342b from cloud-based virtual production environment 104/304 into a local environment including media flow transport security manager 160/260/360, which may be on-premises production environment 102/302, for example.

One way of ensuring the integrity of one or more post-production cloud media flows 142b/342b being transported into on-premises production environment 102/302 is to utilize identifiers in the form of IP addresses of each of cloud-based resources 140 used to process one or more cloud production media flows 142a/342a, for restricting access to on-premises production environment 102/302 from cloud-based virtual production environment 104/304. For example, hardware processor 264 may execute security software code 268 to control firewall 270/370 to allow only media flows originating from IP addresses obtained as identifiers in action 482 to pass into on-premises production environment 102/302 from cloud-based virtual production environment 104/304. In that implementation, hardware processor 264 may execute security software code 268 to control firewall 270/370 to block traffic originating from an IP address other than an IP address obtained in action 482.

Alternatively, or in addition, in some implementations, a transport time window for entry of one or more post-production cloud media flows 142b/342b into on-premises production environment 102/302 from cloud-based virtual production environment 104/304 may be used for restricting access to on-premises production environment 102/302 from cloud-based virtual production environment 104/304. The beginning of such a transport time window may coincide with receiving the alert in action 485, for example. In those implementations, hardware processor 264 may execute security software code 268 to control firewall 270/370 to allow media flows to pass into on-premises production environment 102/302 from cloud-based virtual production environment 104/304 only during the transport time window after receiving the alert in action 384. Hardware processor 264 may execute security software code 268 to control firewall 270/370 to block traffic from cloud-based virtual production environment 104/304 after the transport time window elapses. It is noted that, in various implementations, such a transport time window may have a user specified predetermined duration, or its duration may be determined dynamically by media flow transport security manager 160/260/360, based on any suitable operational criteria, for example. Thus, action 486 may be performed by security software code 268, executed by hardware processor 264 of media flow transport security manager 160/260/360.

It is further noted that, in some implementations, hardware processor 264 of media flow transport security manager 160/260/360 may execute security software code 268 to perform actions 481, 482, 485, and 486, or actions 481, 482, 483, 485, and 486, or actions 481, 482, 484, 485, and 486, or actions 481, 482, 483, 484, 485, and 486 in an automated process from which human involvement may be omitted.

It is also noted that, in some implementations, after processing of one or more cloud production media flows 142a/342a into one or more post-production cloud media flows 142b/342b, one or more post-production cloud media flows 142b/342b may be converted into one or more post-production multicast media flows 132b/332b. Once converted, one or more post-production media flows 132b may be returned to on-premises production environment 102/302, or one or more post-production media flows 132b may be transmitted to physical post-production facility 134. As noted above, physical post-production facility 134 may be another production facility similar to on-premises production environment 102/302, or may be a media distribution hub, such as a regional affiliate or other affiliated media distributor. Conversion of one or more post-production cloud media flows 142b/342b into one or more post-production multicast media flows 132b/332b, as well as recovery or transmission of one or more post-production multicast media flows 132b/332b, may be performed by SDNO 106/306.

Thus, the present application describes a media flow transport security solution that addresses and overcomes the drawbacks and deficiencies in the conventional art. The media flow transport security solution disclosed in the present application can be used to enable a true hybrid cloud-based production environment that is configured to scale to a much greater resource capability than is available locally, while advantageously ensuring the integrity of media flows as they are transported into and/or out of the cloud.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media flow transport security manager of a hybrid cloud-based media production system including a network orchestrator and an extensible resource manager (ERM), the media flow transport security manager comprising:

a firewall; and a computing platform communicatively coupled to the firewall, the computing platform having a hardware processor and a memory storing a security software code;

the hardware processor configured to execute the security software code to:

communicate with the network orchestrator to identify at least one multicast production media flow for processing in a cloud-based virtual production environment;

communicate with the ERM to obtain an identifier of at least one cloud-based resource for processing, in the cloud-based virtual production environment, one or more cloud production media flows corresponding to the identified at least one multicast production media flow;

receive an alert that the one or more cloud production media flows have been processed using the at least one cloud-based resource to generate a corresponding one or more post-production cloud media flows; and route, in response to receiving the alert and using the obtained identifier of the at least one cloud-based resource, the one or more post-production cloud media flows through the firewall.

2. The media flow transport security manager of claim 1, wherein routing the one or more post-production cloud media flows through the firewall transports the one or more post-production cloud media flows from the cloud-based virtual production environment into a local environment including the media flow transport security manager.

3. The media flow transport security manager of claim 1, wherein routing the one or more post-production cloud media flows through the firewall transports the one or more post-production cloud media flows from the cloud-based virtual production environment into an on-premises production environment.

4. The media flow transport security manager of claim 1, wherein the obtained identifier of the at least one cloud-based resource comprises an IP address of the at least one cloud-based resource.

5. The media flow transport security manager of claim 4, wherein the hardware processor is further configured to execute the security software code to:
control the firewall to block traffic originating from an IP address other than the IP address of the at least one cloud-based resource.

6. The media flow transport security manager of claim 1, wherein the hardware processor is configured to execute the security software code to route the one or more post-production cloud media flows through the firewall during a transport time window after receiving the alert.

7. The media flow transport security manager of claim 6, wherein the hardware processor is further configured to execute the security software code to:
control the firewall to block traffic from the cloud-based virtual production environment after the transport time window elapses.

8. The media flow transport security manager of claim 6, wherein the transport time window is predetermined.

9. The media flow transport security manager of claim 1, wherein the hardware processor is further configured to execute the security software code to:
route the one or more cloud production media flows corresponding to the identified at least one multicast production media flow through the firewall to transport the one or more cloud production media flows into the cloud-based virtual production environment.

10. The media flow transport security manager of claim 9, wherein routing the one or more cloud production media flows through the firewall transports the one or more cloud production media flows from an on-premises production environment into the cloud-based virtual production environment.

11. A method for use by a media flow transport security manager of a hybrid cloud-based media production system including a network orchestrator and an extensible resource manager (ERM), the media flow transport security manager including a firewall and a computing platform communicatively coupled to the firewall, the computing platform having a hardware processor and a memory storing a security software code, the method comprising:
communicating, by the security software code executed by the hardware processor, with the network orchestrator to identify at least one multicast production media flow for processing in a cloud-based virtual production environment;
communicating, by the security software code executed by the hardware processor, with the ERM to obtain an identifier of at least one cloud-based resource for processing, in the cloud-based virtual production environment, one or more cloud production media flows corresponding to the identified at least one multicast production media flow;
receiving, by the security software code executed by the hardware processor, an alert that the one or more cloud production media flows have been processed using the at least one cloud-based resource to generate a corresponding one or more post-production cloud media flows; and
routing, in response to receiving the alert, by the security software code executed by the hardware processor and using the obtained identifier of the at least one cloud-based resource, the one or more post-production cloud media flows through the firewall.

12. The method of claim 11, wherein routing the one or more post-production cloud media flows through the firewall transports the one or more post-production cloud media flows from the cloud-based virtual production environment into a local environment including the media flow transport security manager.

13. The method of claim 11, wherein routing the one or more post-production cloud media flows through the firewall transports the one or more post-production cloud media flows from the cloud-based virtual production environment into an on-premises production environment.

14. The method of claim 11, wherein the obtained identifier of the at least one cloud-based resource comprises an IP address of the at least one cloud-based resource.

15. The method of claim 14, further comprising:
controlling the firewall, by the security software code executed by the hardware processor, to block traffic originating from an IP address other than the IP address of the at least one cloud-based resource.

16. The method of claim 11, wherein routing the one or more post-production cloud media flows through the firewall is performed during a transport time window after receiving the alert.

17. The method of claim 16, further comprising:
controlling the firewall, by the security software code executed by the hardware processor, to block traffic from the cloud-based virtual production environment after the transport time window elapses.

18. The method of claim 16, wherein the transport time window is predetermined.

19. The method of claim 11, further comprising:
routing, by the security software code executed by the hardware processor, the one or more cloud production media flows corresponding to the identified at least one multicast production media flow through the firewall to transport the one or more cloud production media flows into the cloud-based virtual production environment.

20. The method of claim 19, wherein routing the one or more cloud production media flows through the firewall transports the one or more cloud production media flows from an on-premises production environment into the cloud-based virtual production environment.

* * * * *